July 28, 1942.   S. O. DORST   2,290,947
ELECTRICAL CONDENSER
Filed Aug. 9, 1939   2 Sheets-Sheet 1
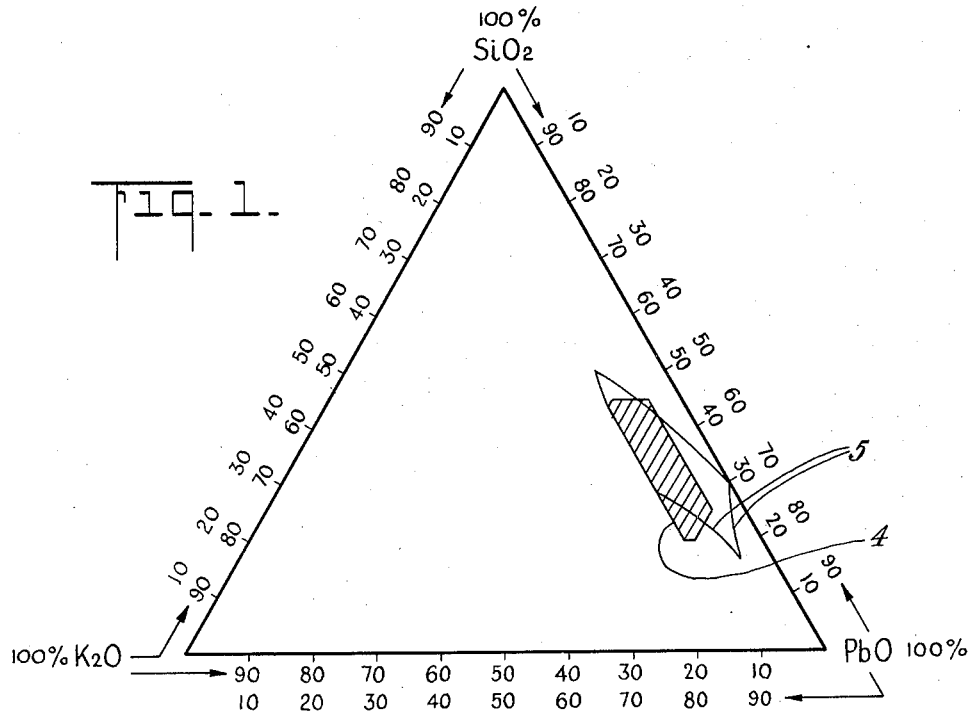
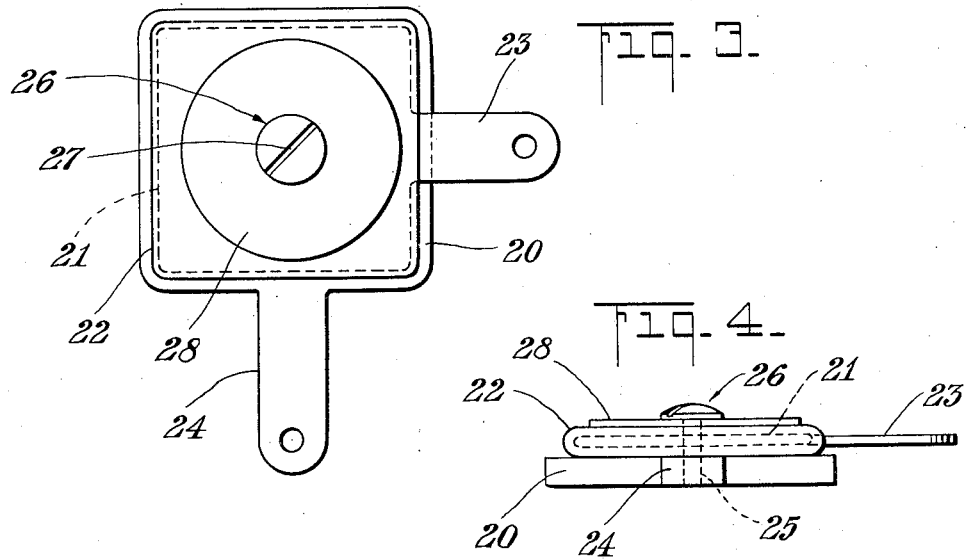
STANLEY O. DORST
INVENTOR.
BY
Dorsey, Cole & Garner
ATTORNEYS July 28, 1942.  S. O. DORST  2,290,947
ELECTRICAL CONDENSER
Filed Aug. 9, 1939  2 Sheets-Sheet 2

STANLEY O. DORST
INVENTOR.

BY Dorsey, Cole & Garnes
ATTORNEYS

Patented July 28, 1942

2,290,947

UNITED STATES PATENT OFFICE 2,290,947

ELECTRICAL CONDENSER

Stanley O. Dorst, North Adams, Mass., assignor to Sprague Specialties Co., North Adams, Mass., a corporation of Massachusetts Application August 9, 1939, Serial No. 289,292

2 Claims. (Cl. 106—46)

The present invention relates to an improved vitreous enamel serving as a solid dielectric material for electrical condensers.

My invention is particularly useful when applied as dielectric layers to condenser electrodes consisting of iron, iron alloys and similar types of metals, and will be described in such application.

It has already been proposed to use vitreous enamels as dielectric layers of electrical condensers. However, the enamels suggested so far have not been successful because of their unsatisfactory electrical characteristics. Thus the enamels heretofore proposed for this purpose had, as a rule, power factors of .5% to 1% or more; large temperature coefficients of power factor—causing the power factor to increase 200% or more within the temperature range of 25° C. to 100° C.; large negative temperature coefficients of resistivity; and high rates of solubility in water and weak electrolytes, whereby their dielectric properties were greatly affected by the degree of atmospheric humidity.

The vitreous enamel dielectric layers of my invention obviates these disadvantages. They possess extremely low dielectric losses even at radio frequencies, have power factors of .15% and even less, which power factors remain substantially unchanged within the operating temperature range of the condensers. Moreover, my vitreous enamel layers are highly insoluble in water and weak electrolytes, and remain unaffected by humidity even under the most adverse conditions.

The vitreous enamel dielectric material of my invention is a potassium lead silicate glass having as constituents potassium oxide, lead oxide and silica in proportions hereinafter more specifically stated.

My invention will be further described with reference to the appended drawings, in which:

Figure 1 is a phase diagram for the system potassium oxide ($K_2O$), lead oxide ($PbO$), and silica ($SiO_2$) showing the ranges of the constituents comprising the potassium-lead silicate dielectric of my invention.

Fig. 3 is a plan view of a condenser provided with the dielectric of the invention.

Fig. 4 is a side elevation of the condenser of Fig. 3.

Figure 2:
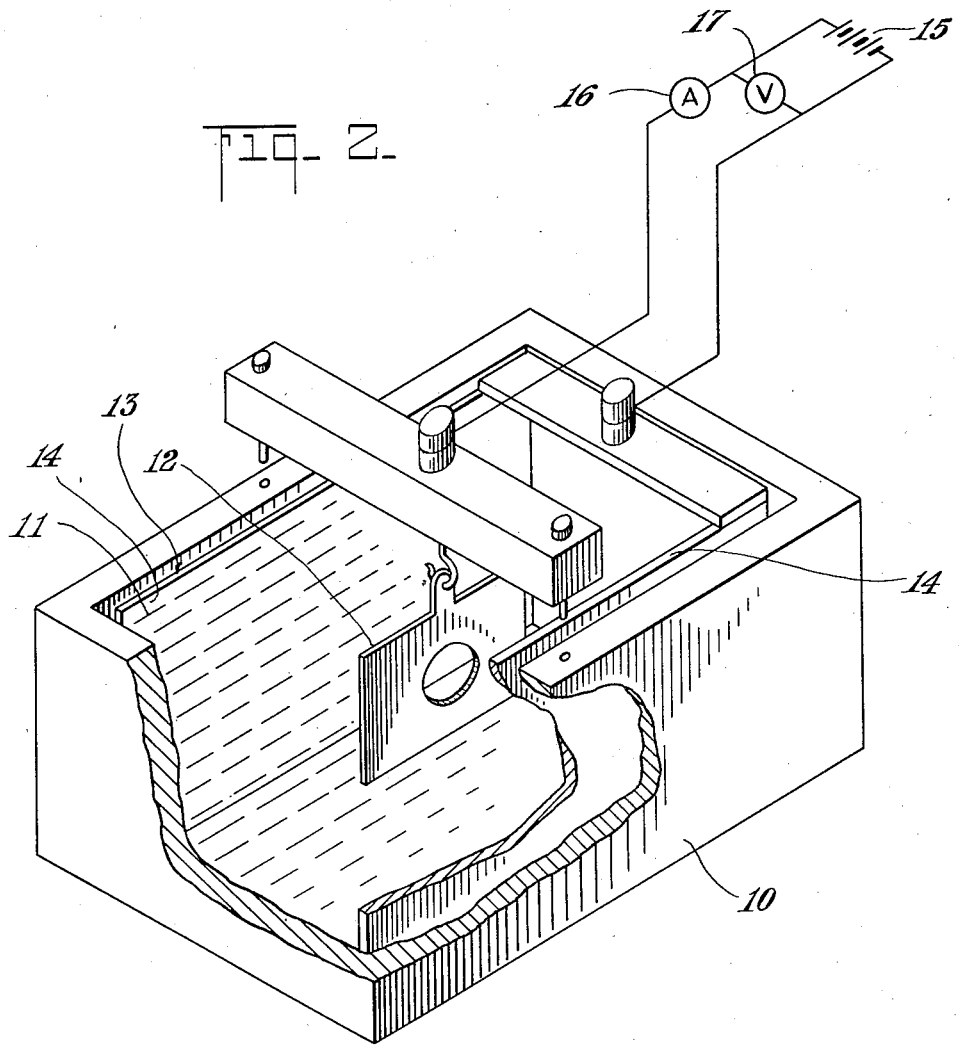
Fig. 2 is a perspective view of a coating cell for cataphoretically coating a condenser electrode with the dielectric of my invention.

The dielectric material of my invention is most suitable when applied as a fused integral coating to the surface of the electrode of the condenser for which it serves as the dielectric. In certain cases to facilitate its adherence to the electrode surface, I add to my vitreous enamel small quantities of a suitable agent which combines with the oxide of the metal of the electrode to be coated.

I have found that to obtain and maintain the low power factor and other desirable electrical characteristics which the dielectric material of the invention is capable of exhibiting, the presence of substances other than its above recited constituents is to be generally avoided. For example, the metals usually employed as condenser electrodes, such as copper and brass, produce during the fusing of the enamel, oxides which are readily soluble in the enamel and which increase its power factor and conductivity.

To prevent such contamination of the dielectric I use for the condenser electrodes to which the enamel is to be fused, metals whose oxides are difficultly soluble in the enamel. Such metals are, for example, iron, nickel, chromium, and alloys thereof, and the electrodes used should either consist of such metals or alloys, or be provided with a substantially impervious coating or plating thereof.

Besides the above requirements, the metal of the electrode should preferably be capable of forming on its surface an oxide layer which facilitates adherence of the enamel by forming an insoluble slag with suitable slagging agents added to the dielectric.

I have found that commercially pure soft iron meets all of these requirements, and in the following description such iron will be considered as the electrode material. It should be well understood that other metals, such as iron alloys, nickel, chromium and their alloys may also be used.

The constituents of the potassium-lead silicate dielectric of my invention must be within a definite range of proportions and I have found that only if the resulting compound falls within a particular field of the phase diagram, hereinafter more specially described, does it provide for a dielectric having the satisfactory electrical and coating properties required, whereby the full benefits thereof can only be obtained by cataphoretic deposition of the compound upon the electrodes.

The proportion of potassium oxide ($K_2O$), lead oxide ($PbO$), and silica ($SiO_2$) are preferably selected to be substantially in their molecular weight ratio, whereby the constituents combine to form a potassium-lead-silicate, having or approximating the formula $K_2O.4PbO.8SiO_2$. Moderate excesses or deficits of one or the other of the above constituents is, however, not deleterious as long as the composition remains within the above stated field of the phase diagram.

In Fig. 1 which represents a simplified phase diagram of the system $K_2O$, $PbO$ and $SiO_2$ I have shown as a shaded portion 4 the field of the compounds suitable for the invention. As seen from this figure the ranges of the constituents (in proportion by weight) are about as follows:

5% to 12% potassium oxide
44% to 70% lead oxide
20% to 45% silica

The field represented by the shaded portion 4 closely approximates the field of stability for the compound $K_2O.4PbO.8SiO_2$ given by R. F. Geller and E. N. Bunting in the National Bureau of Standards Journal of Research vol. 17 pp. 277–289 (1936). The there given field has been superimposed over the field 4 in Fig. 1 and is shown therein as the curve 5.

To the above recited constituents I usually add about 1% to 2% of a slagging agent, for example, a mixture of cobalt oxide and manganese dioxide.

I have found that if either the potassium or lead oxide is increased beyond the shown limits, the compounds fall outside of the above defined field and their dielectric losses are considerably higher than those of the compounds within the field. On the other hand too high a proportion of silica causes the enamel to fish scale after fusion. It should be noted also that decreasing the amount of potassium oxide increases the fusion temperature and for this consideration I prefer not to use less than about 8% thereof.

Admixtures of other alkali oxides should be avoided. I have found, for example, that even small proportions (1% to 3%) of sodium, very deleteriously affects the power factor of the dielectric.

A preferred example of my novel dielectric is given below:

To 56.5% lead monoxide (litharge), I add 34% silica, 8% potassium oxide (which may be added in the form of potassium nitrate which decomposes on heating to potassium oxide), 1% manganese dioxide and .5% cobalt oxide.

These ingredients are thoroughly mixed and then heated in a suitable crucible to approximately 900° C., for a time sufficient to bring about their chemical reaction. At the above temperature, heating for about one-half to one hour is required to achieve the desired reaction. By using higher temperatures the chemical reaction can be accelerated; however, increasing the temperature results in an increased rate of gas liberation during the reaction, which is objectionable as it tends to cause the molten mixture to foam and overflow from the crucible.

Upon completion of the reaction the molten enamel is allowed to cool, after which it is removed from the crucible and crushed, preferably to a fine powder.

While the enamel may be deposited on the electrode by any of several processes, for example, by painting, spraying, or applying it as a dry frit, such processes generally require the use of a binder, such as kaolin, the presence of which brings about an increase in the power factor of the dielectric.

The full advantage of my invention is realized only if the enamel is applied by its cataphoretic deposition on the surface of the condenser electrode and vice versa the enamel of the invention is extremely well suited to produce satisfactory cataphoretically deposited dielectric layers. The preferred method for carrying out such deposition is by means of the process described in the copending application of Preston Robinson and Stanley O. Dorst, S. N. 197,692, filed March 23, 1938.

It should be noted that past efforts to obtain satisfactory cataphoretically deposited dielectric layers of lead silicates failed. This because on one hand the lead silicates themselves are sufficiently soluble in water to make their cataphoretic deposition from an aqueous suspension difficult if not impossible. On the other hand when lead silicates are suspended in other media in which they are insoluble, for example, in alcohol, the suspensions gave deposits which were loosely adherent and had poor dielectric properties.

The potassium-lead silicate of the invention is substantially insoluble in water, which result in itself is unexpected as it would generally be expected that the addition to lead silicate of an alkali would make the lead silicate more rather than less soluble in water. Thus my enamel can be cataphoretically deposited from an aqueous suspension on the anode and such deposition gives extremely well adherent layers of highly satisfactory dielectric properties.

For the cataphoretic deposition of the potassium lead silicate I pulverize the compound obtained as above stated, in a ball mill until the particles are less than 30 to 60 microns in diameter.

To apply the dielectric coating by cataphoresis, I use a coating cell comprising as shown in Fig. 2 a container 10, preferably of a suitable insulating material such as hard rubber, "Bakelite," etc. The aqueous suspension 11 used for the coating by cataphoresis substantially fills the container 10, and comprises 750 grams of the powdered potassium lead silicate in one liter of distilled water. The electrode 12 to be coated is made the anode of the cell and a second electrode 13 in the form of two interconnected copper plates 14—14, disposed on each side of the electrode 12, forms the cathode. A suitable direct current source represented as a battery 15, is connected across the electrodes 12 and 13. Suitable instruments in the form of an ammeter 16 and a voltmeter 17 are connected respectively, in and across the coating circuit.

The exact value of the voltage used and the duration of the deposition depends on the desired thickness of the coating, and on the geometry of the electrodes and coating cell. Under certain conditions, for example, I have used a coating voltage of 60 volts for five seconds to obtain a layer .006″ thick.

After the electrode has so been coated, it is placed in a heated air column or a drying oven heated to a temperature of approximately 100° C. or below, to remove all traces of water from the coating. After this the coating is fused to the electrode metal by heating it to a temperature of approximately 800–900° C. for five to ten minutes. The required fusing time for individual cases depends on such factors as the heat capacity of the furnace, the size of the coated electrode and the required thickness of the dielectric coating, whereas the exact fusing temperature may somewhat vary with the selected proportions of the constituents of the dielectric.

In no case should the dielectric be heated to the extent that it becomes highly fluid, as in such state surface tension forces are set up in it, which draws the dielectric away from the edges of the electrode, thus leaving them bare or at least reducing the thickness of the coating at these portions.

A condenser having an electrode cataphoretically coated with the dielectric of the invention is shown in Figs. 3 and 4. The condenser comprises a metal base 20 of steel, brass, copper or the like, serving as one electrode of the condenser. The other electrode of the condenser comprises a metal plate 21 cataphoretically provided with an integral coating 22 of the potassium-lead silicate dielectric of my invention. The plate 21 is preferably of commercially pure soft iron although it may consist of an iron alloy or of nickel, chromium, and their alloys as previously described. The plate 21 is provided with an extension lug 23 which serves for its external electrical connection. A similar lug 24 provided on the metal base 20 serves for electrical connection to this electrode and also as a mounting means for the condenser.

The base 20 is provided with a central tapped hole 25 adapted to receive a screw 26 having a slotted head 27. The screw 26 passes through a corresponding aperture of the plate 21 and serves to hold this plate to the base 20.

Interposed between the dielectric 22 and the screw head 27 is a washer 28 which for condensers of small capacity may be of an insulating material such as pressed cardboard, hard rubber, "Bakelite" or the like. For condensers of somewhat larger capacity the washer 28 is preferably of metal and serves as an additional electrode plate of the condenser.

While I have described my invention by means of specific embodiments and by specific examples, I do not wish to be limited thereto as obvious modifications will occur to those skilled in the art without departing from the spirit and scope of the invention.

What I claim is:

1. A vitreous dielectric material for electrical condensers comprising the constituents, about 56.5% lead oxide, about 8% potassium oxide, and about 34% silica.

2. A vitreous dielectric material for electrical condensers consisting substantially of a potassium lead silicate which is included within the field of stability for the compound $$K_2O.4PbO.8SiO_2$$

STANLEY O. DORST.